UNITED STATES PATENT OFFICE.

DANIEL W. PRESCOTT, OF EDINBURGH, VIRGINIA.

IMPROVEMENT IN THE MANUFACTURE OF SOLUBLE PHOSPHATES FOR FERTILIZERS.

Specification forming part of Letters Patent No. 119,994, dated October 17, 1871; antedated October 7, 1871.

*To all whom it may concern:*

Be it known that I, DANIEL W. PRESCOTT, of the town of Edinburgh, in the county of Shenandoah and State of Virginia, have invented a new mode of manufacturing the superphosphate of lime or soluble phosphate of lime, to be known as Prescott's Patent Plant-Propagator or Soluble Phosphate of Lime; and I do hereby declare that the following is a full and exact description thereof.

The nature of my invention consists in dissolving bone-dust as follows: I take sixteen hundred pounds of bone-dust and three hundred pounds of soda-ash and mix them together, and moisten the mass with from fifteen to twenty gallons of water, or sufficient to moisten it thoroughly, and let it remain in a heap for about two weeks. Then dry the mass.

What I claim as my invention, and desire to secure by Letters Patent, is—

The solution of bone-dust by the use of soda-ash, which uniting with the gelatine of the bone forms a soapy compound, acting upon the particles of bone, forming a soluble compound thus fitted for prompt action as plant-food.

DANIEL W. PRESCOTT.

Witnesses:
   I. I. STONEBURNER,
   JAMES N. SWANN. (96)